G. H. DOERING.
SPLIT RING.
APPLICATION FILED JULY 10, 1917.
1,264,379.
Patented Apr. 30, 1918.
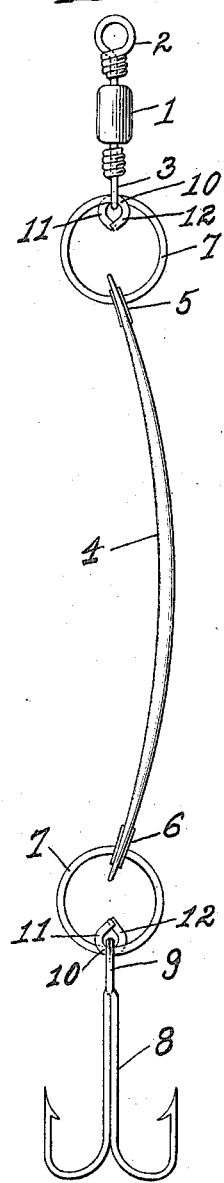
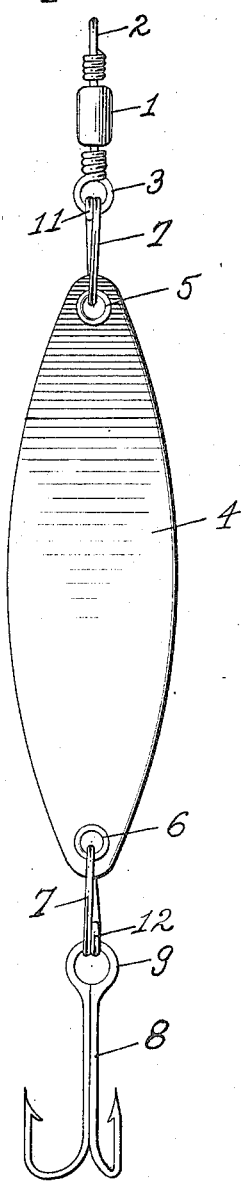
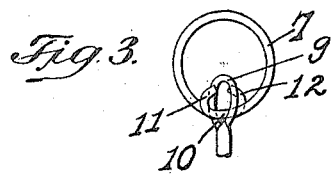
Inventor
George H. Doering
By his Attorneys

UNITED STATES PATENT OFFICE.

GEORGE H. DOERING, OF BROOKLYN, NEW YORK.

SPLIT RING.

1,264,379.  Specification of Letters Patent.  Patented Apr. 30, 1918.

Application filed July 10, 1917. Serial No. 179,631.

*To all whom it may concern:*

Be it known that I, GEORGE H. DOERING, a citizen of the United States, and resident of the borough of Brooklyn, county of Kings, city and State of New York, have invented certain new and useful Improvements in Split Rings, of which the following is a specification.

This invention relates to improvements in split or divided retaining or connecting rings, and while the device is especially applicable for use in connection with a spinner for fishing tackle, it will be obvious that it is capable of use for various other purposes, such as a suspending hook, or a separable connection between two articles or devices.

The invention has for its object the provision of a simple, inexpensive and easily manufactured split retaining or connecting ring which will securely connect the articles to which it is attached and which may be operated to readily remove or disconnect one or all of the articles from the ring.

A further object of the invention is to provide a divided retaining ring adapted to detachably connect a fishing hook to the spoon of a spinner or to the end of a fishing line, and which is so constructed that movement of the hook around the ring is prevented, and which may be operated to readily release the hook without danger of injury to the hand of the operator.

In the accompanying drawings, Figures 1 and 2 are side and front elevations showing the improved retaining ring employed for connecting a spinner spoon to the swivel at the end of a fishing line and for connecting a fish hook to the spoon; and Fig. 3 is a detail front elevation showing the manner of releasing the hook or other device from the ring.

Referring to the drawings by numerals, 1 designates a swivel of ordinary construction having an eye 2, to which the end of the fishing line is secured, and an eye 3. The spoon 4 is of well known construction and is formed with an aperture or eye 5 at one end and an aperture or eye 6 at its opposite end. The swivel is connected to the spoon by a split or divided ring 7 passing through the eye 5 in the spoon and connected to the eye 3 of the swivel. The gang or other hook 8 may be of any suitable construction and is connected to the spoon by a divided ring 7 passing through the eye 6 in the spoon and engaging the eye 9 formed at the upper end of the hook.

Heretofore the spoon has been commonly connected to the swivel and hook by split rings resembling the ordinary key-ring and formed of two convolutions of flattened resilient wire pressed closely together.

The improved divided connecting ring 7 is preferably formed by bending a piece of relatively stiff resilient wire to circular form with the ends of the wire overlapping each other a short distance, as shown at 10. The free ends of the wire are bent inwardly and backwardly to form oppositely facing hook-shaped portions 11 and 12. The outer ends of the hook-shaped portions 11 and 12 normally meet, or preferably slightly overlap, as shown in the drawings, to form a closed eye or loop within which the eye of the swivel or the hook is confined. The swivel, hook or other device is thus held against movement about the ring and also securely locked against accidental detachment from the ring.

To disengage the swivel or the hook from the ring, the opposite sides of the ring are pressed inwardly toward each other to separate the oppositely facing hook-shaped portions 11 and 12, whereupon the eye is moved inwardly toward the center of the ring, as shown in Fig. 3, to lift the same out of the loop formed by the hooks. The eye is then shifted laterally over one of the hooks and may then be readily passed between the overlapped portions 10 of the divided ring to disengage the eye from the ring.

While the improved divided ring is shown as formed of wire and bent to circular form, it will be obvious that it may be formed of any suitable resilient material and may be bent to form a square or polygonal ring instead of a circular ring, if desired.

It will be observed that the swivel and hook may be very readily detached from the rings, that the ring is of very simple and inexpensive construction, that it may be easily manufactured and requires a minimum amount of metal stock in its manufacture, and that the hook, swivel or other device or article is securely locked on the ring.

What I claim is:

1. A divided retaining ring formed of a piece of resilient wire bent to substantially circular form and having the ends thereof overlapping and bent inwardly and backwardly to form oppositely facing hook-shaped portions, the ends of said hook-shaped portions being normally overlapped to form a closed loop within the ring, said ring being compressible.

2. A device of the class described, comprising a length of resilient metal stock bent to substantially circular form and having overlapping end portions bent backwardly in opposite directions, the free ends of said backwardly bent portions normally overlapping to form a closed loop, said ring being compressible.

3. A device of the character described comprising a length of relatively stiff resilient material bent to form a divided compressible ring, the end portions of said length of material being bent so as to form a normally closed eye or loop at one side of and within said ring.

4. A device of the character described comprising a divided resilient suspending ring the end portions of said ring being overlapped throughout a portion of the circumference of the ring, and a pair of oppositely facing hooks carried by said overlapped end portions of the ring, said hooks being adapted to normally form a closed eye at one side of the ring, said eye projecting into the ring but terminating short of its center.

In testimony whereof I hereunto affix my signature.

GEORGE H. DOERING.

Copies of this patent may be obtained for five cents each, by addressing the "Commissioner of Patents, Washington, D. C."